(12) United States Patent
Lindner (10) Patent No.: US 8,015,844 B2
(45) Date of Patent: Sep. 13, 2011

(54) INSTALLATION AND METHOD FOR THE PRODUCTION OF GLASS STOPPERS USED FOR SEALING BOTTLES

(75) Inventor: Walter Lindner, Riedlhuette (DE)

(73) Assignee: Boropal Technology Trading GmbH, Grafenau-Reismuehle (DE)

( * ) Notice: Subject to any disclaimer, the term of this patent is extended or adjusted under 35 U.S.C. 154(b) by 1300 days.

(21) Appl. No.: 10/534,659

(22) PCT Filed: Nov. 10, 2003

(86) PCT No.: PCT/EP03/12513
§ 371 (c)(1),
(2), (4) Date: Nov. 9, 2005

(87) PCT Pub. No.: WO2004/043869
PCT Pub. Date: May 27, 2004

(65) Prior Publication Data
US 2008/0011712 A1    Jan. 17, 2008

(30) Foreign Application Priority Data

Nov. 12, 2002 (DE) .................................. 102 52 578
May 7, 2003 (DE) .................................. 103 20 345
Jul. 14, 2003 (DE) .................................. 103 31 821

(51) Int. Cl.
*C03B 11/06* (2006.01)
(52) U.S. Cl. ................. 65/362; 65/305; 65/226
(58) Field of Classification Search ............ 65/69, 115, 65/305, 206, 226, 362
See application file for complete search history.

(56) References Cited

U.S. PATENT DOCUMENTS 1,507,055 A    9/1924    Forger
(Continued)

FOREIGN PATENT DOCUMENTS
DE    19649030 A    6/1998
(Continued)

OTHER PUBLICATIONS

DE 19649030 (Machine Translation) [online], [retrieved on Oct. 29, 2009], retrieved from EPO Database (http://v3.espacenet.com/publicationDetails/biblio?CC=EP&NR=0769687A1&KC=A1&FT=D&date=19970423&DB=&locale=).*

(Continued)

*Primary Examiner* — Matthew J Daniels
*Assistant Examiner* — Yana Belyaev
(74) *Attorney, Agent, or Firm* — Kilpatrick Townsend & Stockton LLP (57) ABSTRACT

The invention relates to an installation and a method for producing glass stoppers which are provided with a head portion and are used for sealing wine bottles and sparkling wine bottles. The installation comprises a mold for producing glass stoppers, a feeder system for supplying the mold with molten glass, a multistation press, and a removing and handling system for the finished glass stoppers. The mold is formed by a base that comprises a recess corresponding to a first partial length of the stopper, a central part consisting of two partial molding elements which can be displaced relative to each other as well as perpendicular to the longitudinal axis of the mold, can be coupled in a self-centering manner, and define a hollow space that corresponds to a second partial length of the stopper and to at least one main area of the head portion when the partial molding elements are coupled and rest against the base, and a top part which seals the hollow space of the head portion and is provided with a central male die that can be displaced in an axial direction relative to the top part so as to embody a recess in the head portion of the stopper, the recess compensating tolerances.

17 Claims, 4 Drawing Sheets

U.S. PATENT DOCUMENTS 4,772,306 A * 9/1988 Davey et al. .................... 65/325
D519,835 S * 5/2006 Dubs et al. .................... D9/438

FOREIGN PATENT DOCUMENTS

| DE | 19649030 A1 | * | 6/1998 |
| DE | 19823515 A | | 12/1998 |
| DE | 19823515 A1 | * | 12/1998 |
| EP | 0180286 A1 | | 5/1986 |
| EP | 0564090 A | | 10/1993 |
| EP | 0861811 A | | 9/1998 |
| FR | 2187712 A | | 1/1974 |
| GB | 302193 A | | 12/1928 |
| GB | 563800 A | | 8/1944 |
| JP | 66813 | | 12/1925 |
| JP | 60239331 A | | 11/1985 |
| JP | 06001619 A | | 1/1994 |

OTHER PUBLICATIONS

DE 19823515 (Machine Translation) [online], [retrieved on Oct. 29, 2009], retrieved from EPO Database (http://v3.espacenet.com/publicationDetails/biblio?CC=EP&NR=0769687A1&KC=A1&FT=D&date=19970423&DB=&locale=).*

DE 19823515 [human translation], Jan. 2011, Schreiber Translations, Inc.*

* cited by examiner

Fig. 4

INSTALLATION AND METHOD FOR THE PRODUCTION OF GLASS STOPPERS USED FOR SEALING BOTTLES

BACKGROUND OF THE INVENTION

The invention relates to a plant for the manufacture of glass stoppers provided with a head part for the closing of bottles, in particular of wine bottles and sparkling wine bottles, comprising a multi-part mold which determines, in the closed state, the negative contour of the stopper to be manufactured, a feeder system for the supply of the mold with molten glass, a multistation press and an arrangement for the removal and for the further handling of the glass stoppers produced as well as glass stoppers in particular produced by means of such a plant.

Glass stoppers for the closing of bottles are known. These known glass stoppers are usually manufactured by means of the so-called injection method, i.e. liquid glass material, which fills the hollow space of the mold, and is injected into a closed mold from the lower side or from the upper side. After corresponding cooling, the solidified glass string at the supply side has to be cut off. It is not only a disadvantage in this process that the cut position also has to be ground and polished for the re-establishment of the glass character, but substantial residual glass above all arises in the reservoir which has to be eliminated or, optionally, sent to recycling. Generally, this injection process for the manufacture of glass stoppers is technically complex and accordingly also expensive.

SUMMARY OF THE INVENTION

It is an object of the present invention to provide a plant for the manufacture of glass stoppers for the closing of bottles which, on the one hand, ensures a glass stopper production in accordance with precisely pre-determined contours and, on the other hand, permits a dramatic reduction in the production costs and thus the use of such glass stoppers in particular subsequently completed with an elastic seal in a large volume and also permits conventional closing corks as a replacement.

A plant in accordance with the invention includes a multi-part mold which determines, in the closed state, the negative contour of the stopper to be manufactured, a feeder system for the supplying of the mold with molten glass, a multistation automatic press and an arrangement for the removal and for the further handling of the glass stoppers produced; and this plant is characterized in that the mold is formed by a base part having a cut-out corresponding to a first part length of a stopper, by a middle part of two part elements of a mold which can be displaced relative to one another and perpendicular to the longitudinal mold axis, which can be coupled in a self-centering process and which determine a hollow space corresponding to a second part length of a stopper and to at least one main region of the head part in the coupled state and in the state contacting the base part, and by an upper part closing the hollow space of the head part and having a central pressing stamp axially displaceable relative to the upper part for the formation of a tolerance compensating recess in the head part of the stopper.

It is possible in a surprising manner by means of such a plant, despite unavoidable fluctuations of the weight of the glass gob required to feed the mold and despite unavoidable changes in the mold volume caused by necessary mold cleaning processes, to permanently satisfy the pre-determined precision demands, and indeed by the specific design of the mold, on the one hand, and the provision of a tolerance compensating recess in the head part of the stopper, on the other hand.

A particularly advantageous aspect of the invention is characterized in that the hollow space of the mold associated with the middle part extends axially upwardly beyond the planar surface of the head part and the upper part with an associated pressing stamp closing the hollow space of the head part and engages in a shape-matched manner with a ring neck into the hollow space determined by the part elements of the mold, with the outer diameter of the ring neck being smaller than the outer diameter of the head part.

In this manner, the head part of the stopper—to the extent its radially outer contours are affected—is shaped in the hollow space formed by the part elements of the mold. The planar surface of the head part is bounded by the ring neck and by the plunger of the upper part of the mold. When the mold is closed, the position of the dividing line between the upper part of the mold and the part elements of the mold forming the middle part of the mold is selected such that it is disposed beneath the planar surface in the region of the stopper rounding. In this manner, any disturbing, in particular function-disturbing burr-formation, is eliminated with certainty and, moreover, a perfect surface of the upper planar surface and of the upper cylindrical surface of the head part is ensured.

The part elements of the mold determining the individual regions of the mold are made such that they center themselves when moved together, for which purpose the mold surfaces contacting one another in the closed state are provided with complementary mold closing members which preclude any lateral offset. The avoidance of lateral offset is of substantial importance for the observation of the precision criteria. In this connection, the provision of a cross-centering device between the middle part and the upper part also has a particularly advantageous effect.

A further special feature of the invention consists of the fact that the station designed for the feeding of the mold with glass gobs is simultaneously made as a station for the carrying out of the pressing process. In this manner, a substantial quality improvement of the glass stopper is achieved, since the pressing process is carried out immediately directly after the introduction of a glass gob into the mold, i.e. without any disturbing time loss, and thus a fast attachment of the still relatively liquid glass to the mold on all sides is promoted which in turn results in a high surface quality of the finished product.

The feeder system used is made such that the individual glass gobs can impact onto the base of the mold while falling through the middle part of the mold without touching, for which purpose the diameter-to-length ratio of the individual glass gobs is selected to be in the range from approximately 1:3.5 and it is thus achieved that the respective glass gob length is larger than the depth of the total hollow space of the mold.

A likewise important measure for the high quality of the manufactured glass stopper consists of the fact that a fall and guide channel is provided in the feed station for the mold-centered supply of glass gobs with a pre-settable drop height. By this selectable drop height, which can, for example, lie in the range of approximately 1 m, so much kinetic energy can specifically be imparted to the respective glass gob that the impact energy resulting therefrom in the hollow space of the mold is just sufficient to bring the liquid glass of the glass gob practically abruptly into contact with the mold wall over the total mold height, and indeed up to and into the upper region, where the ring neck and the stamp of the upper part of the mold then become effective. This abrupt and full-area striking of the whole mold wall ensures a high quality of the glass or of the article.

The mold consisting of the individual components is preferably suspended freely hovering in a mold holder, in particular via a type of collar arm such that a free space is created beneath the mold into which any cullets which may arise, or also stoppers not correctly transported away, can fall so that no risk of a disturbance of the closing movement of the mold can arise.

To ensure that releasing tendencies of the glass from specific regions of the mold wall during the cooling process which can result in a reduced quality are eliminated, in accordance with the invention, a mechanical or pneumatic follow-up pressing takes place in one or more stations downstream of the feeding and pressing station, which results in a stabilization of the outer skin. For this purpose, the recess and/or the planar surface are also acted on by pressure by compressed air or also by means of a stamp for a brief period, e.g. during approximately half a second.

A device which becomes active directly after the pressing process is preferably used for the short-term heating of the region of the recess of the head part to achieve shrinking processes being restricted to this region not representing a functional surface. If the collapsing of the surface due to shrinking in this non-critical region is to be prevented or minimized, a pressing stamp with a concavely formed end face is preferably used so that the convex region initially created is changed to a substantially planar region after shrinking has taken place and thus a higher quality product is created.

The measures described above also contribute entirely to the fact that the tolerances in the region of the seal to be received can be pre-determined in a very defined manner and can be observed precisely, which is of substantial importance for the trouble-free function of the finished glass stopper in cooperation with a bottle to be closed.

A glass stopper in accordance with the invention for the closing of bottles which is in particular suitable for the reception of a ring-shaped seal element in the transition region from the stopper part to the head part is characterized in that this glass stopper is made as a pressed glass stopper and in that a plate-shaped or dish-shaped recess with or without lettering is provided in the head part adjoining the stopper part.

The volume of this recess does not have to remain constant in the production of a plurality of such glass stoppers, but it is characteristic for the glass stoppers in accordance with the invention that this volume is variable to a certain extent in order to compensate tolerances of the glass gobs and/or changes of the hollow space of the mold in this manner.

The stopper part has a ring-shaped recess adjacent to the head part for the reception of a ring-shaped seal, in particular a seal L-shaped in cross-section, wherein the part of the L-shaped seal disposed in the recess is designed somewhat in the manner of a bead in the manner of an O ring and the part of the L-shaped seal adjoining the lower side of the head part is designed in the form of a flat ring so that this seal part of flat-ring shape comes to lie between the upper end of a bottle and the head part.

Glass stoppers for the closing of bottles are subjected to very substantial strains and stresses in practice, with damage to such glass stoppers being able to result in a restriction of their function and in particular also to risks for the consumer. There is accordingly a large interest in ensuring that such glass stoppers are not damaged where possible on their way between the manufacture in the glass press and their end in the glass container for recycling glass.

It becomes possible in accordance with the present invention to dramatically increase the insensitivity of such glass stoppers with respect to mechanical damage, for which purpose the glass stoppers are subjected to a controlled hardening process directly after their mold removal in the press.

In this controlled hardening process, the glass stoppers are first heated to a substantially uniform temperature throughout, in particular in the range of 500 to 600° C., and are then cooled very intensely, in particular with fan air, with first the outer skin of the glass stopper being cooled very fast as part of this intense cooling and thus being stabilized.

Since glass is a poor conductor of heat, it takes some time until the heat stored at the interior of the glass stopper can move outwardly and be dissipated by the fan air. During the cooling of the core of the glass stopper, this core attempts to shrink or to contract, which is, however, prevented by the already cooled and so firm outer skin. The consequence of this is that very strong tensile stresses build up at the interior of the glass stopper which are compensated and balanced by corresponding pressure stresses inside the outer skin.

The glass stopper thermally hardened by controlled quenching in accordance with the invention has substantial compression stresses in its outer regions; i.e. before the glass stopper breaks, tensile stresses must first be introduced into these outer regions which are higher than the compression stresses induced by the controlled quenching. The glass stopper accordingly has a substantially increased strength in use.

This high strength of the glass stopper in accordance with the invention represents a substantial safety aspect in the handling and practical use of the glass stoppers and also ensures an always absolutely secure closing of the bottles. This could not be ensured in the required manner if the stopper were even slightly damaged and if in particular the support surface for the seal were impaired.

Such disturbing damage can in particular also occur in the bottling machine of the bottles; however thermally hardened stoppers in accordance with the invention are decisively less sensitive to such risks of damage.

If, however, such a stopper in accordance with the invention is actually damaged, e.g. by scratching or the like, this stopper would immediately disintegrate into a plurality of small particles due to the high stresses present in the glass; i.e. a practically automatic separating out of damaged stoppers takes place. The disintegration into a plurality of small particles also represents an advantage under safety aspects.

Embodiments of plants in accordance with the invention will be described in the following with reference to the drawing.

DESCRIPTION OF THE PREFERRED EMBODIMENTS

Figure 1:
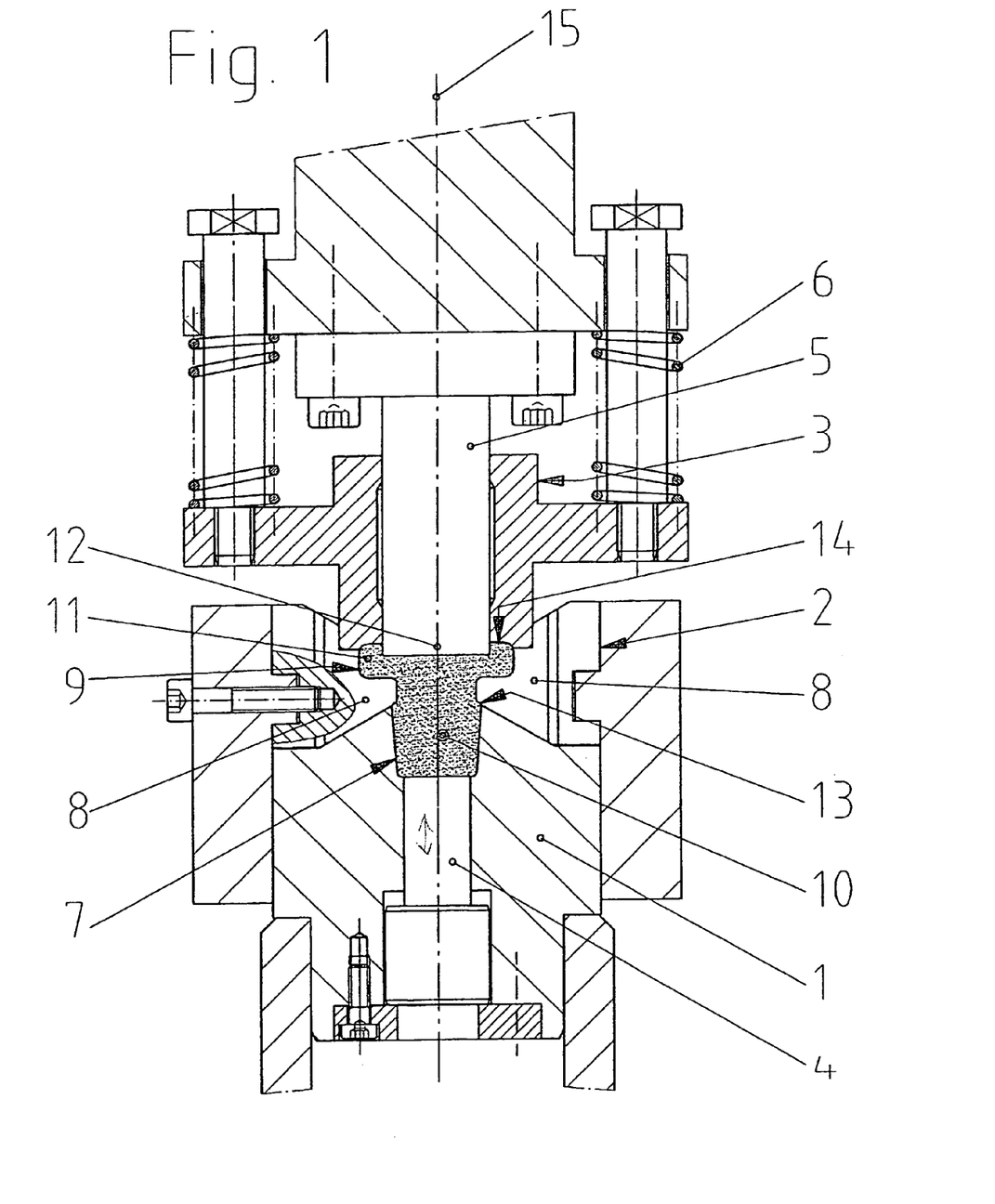
FIG. 1 is a schematic axially sectional representation of the mold used inside the plant for the manufacture of glass stoppers.

In accordance with FIG. 1, a mold suitable for the manufacture of a pressed glass stopper 10 in accordance with the invention includes a base part 1, a middle part 2 and an upper part 3 to which an axially movable pressing stamp 5 belongs.

The preferably cylindrical pressing stamp 5 is guided separately or precisely in the upper part 3 of the mold and is supported with respect to this upper part via a plurality of compression springs 6, which are preferably arranged in ring shape, and a centrally arranged compression spring or pneumatic cylinders such that, in the mold closing process, the upper part 3 first comes into contact with the middle part 2 and the pressing stamp 5 then comes into lagging effect.

A cut-out 7 is provided in the base part 1 which is closed at the base side by a plunger 4 whose diameter is smaller than the base area of the cut-out 7. This plunger 4 has a planar, concavely or convexly formed shape or any end face forming a desired shape in the article and is axially movably supported. The plunger 4 takes over an ejection function with respect to a finished glass stopper when the mold is open. It is particularly advantageous to design the axial movability of the plunger 4 such that it can be retracted in the feeding process while enlarging the hollow space of the mold. An improvement of the feed is achieved in this manner since the elongate drop can be received in the mold in a particularly favorable manner with a retracted plunger such that the upper mold region initially remains free, i.e. does not come into contact with the molten glass, and the danger of an unwanted tilting of the elongate glass drop is moreover eliminated. On the closing of the mold, the plunger 4 and the pressing stamp 5 can be moved in opposite directions.

The slightly conical shape of the lower part of the stopper 10 is pre-determined by the cut-out 7. A discontinuity 13 is provided at the transition from the base part to the middle part in the outer contour of the stopper, since a transition from the conical region to a cylindrical region takes place at this point. A disk-shaped head part 11 adjoins this cylindrical region of the stopper 10 and its outer contour is pre-determined in this case by the middle part 2 and the upper part 3 of the mold. An embodiment preferred with respect to this will still be explained with reference to FIG. 4.

The two mold halves 8, 8' of the middle part 2 are made in a self-centering manner for the avoidance of any lateral offset on the putting together and determine a hollow space 9 which is closed by the upper part 3. This hollow space 9 defined in this manner can be pre-set very precisely and the mold in accordance with the shape ensures not only a precise pre-setting of the thickness dimension of the ring-shaped head part, but also a planar surface of high quality at the front face of the stopper.

The formation of a recess 12 in the head part 11 by means of the pressing stamp 5 is of particular importance since tolerances of the glass gobs and/or changes of the hollow space of the mold, originating from required cleaning processes, can be compensated by this recess such that the demands on the precision of the outer contours of the stopper 10 can always be ensured.

On the operation of the mold in accordance with the invention, the introduction of the glass gobs provided by means of the feeder apparatus can take place such that the glass gob formed can fall freely downwardly to the base of the base part 1 and an attachment of the glass mass to the mold walls takes place in the course of the collapse of the elongate glass gob, with the mold being closed by means of its upper part 3 when the glass mass has substantially filled up the hollow space 9.

Figure 4:
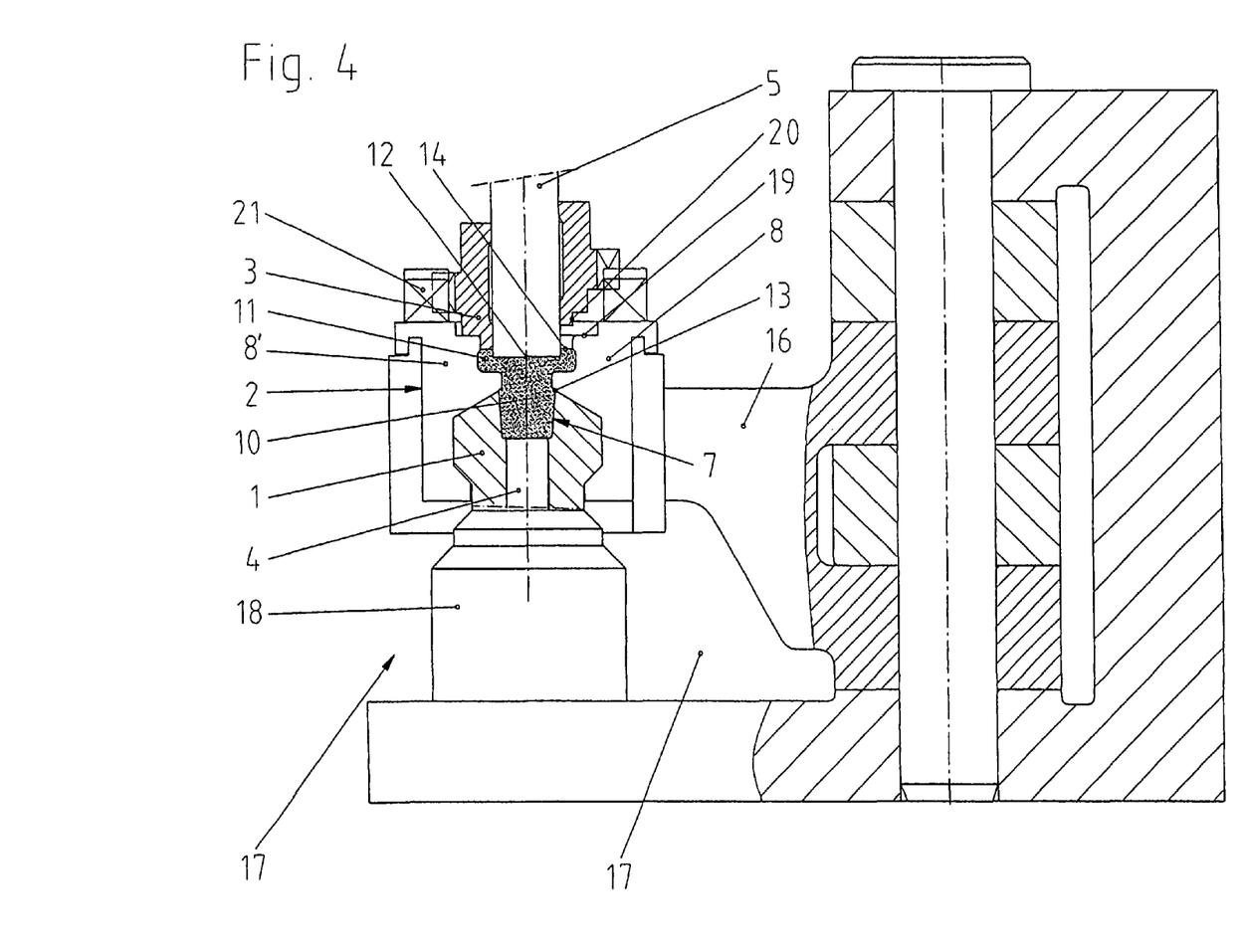
FIG. 4 is a further schematic axially sectional representation approximately analogous to FIG. 1, with a particularly advantageous aspect and a corresponding interaction between the part elements of the mold and the upper part of the mold, however, being realized.

FIG. 4 shows an embodiment substantially corresponding to the previously described plant, but improved, with the outer contour of the head part 11 being largely pre-determined by the middle part 2 of the mold. For this purpose, the hollow space 9 determined by the part elements 8, 8' of the mold is guided upwardly in the axial direction beyond the planar surface 14 of the head part 11, and the upper part 3 with the associated pressing stamp 5 closing the hollow space of the head part is fitted with a ring neck 20 which engages in a shape-matched manner into the hollow space 9 determined by the part elements 8, 8' of the mold. In the closed state of the mold shown on the left-hand half of the representation, the upper part 3 is seated on a ring shoulder 19 of the part elements 8, 8' of the mold. The outer diameter of the ring neck 20 is smaller than the outer diameter of the head part 11. The radially outer region of the ring neck 20 is concavely curved, which has the consequence that the dividing line between the upper part 3 of the mold and the middle part 2 is disposed beneath the planar surface 14 so that any burr formation in the region of the planar surface 14 representing a functional surface is generally precluded. The quality of the stopper produced is thus further increased and a possible source for rejects is eliminated.

The cross centering device 21 provided, which also always functions well at different temperatures, contributes to the achieving of an always constant high quality. The grooves marked by a crossed quadrilateral are arranged concentrically to the ring neck 20 and are fitted to the part elements 8, 8' of the mold, whereas the associated noses engaging into the grooves are provided in a corresponding manner at the upper part 3 of the mold. The arrangement of the grooves and of the associated noses can also take place in a reverse manner with respect to their position.

It is important for all the described embodiments of plants in accordance with the invention that the introduction of the molten glass gob into the mold and the closing of the mold associated with the final molding of the glass gob take place in connection with the pressing process in one station, since this ensures a minimization of the time span between the lens gob supply and the demolding of the glass stopper and thus ensures a high quality.

A fall and guide channel is preferably provided in the feed station in order to achieve the desired high quality of the produced glass stopper, the fall and guide channel making it possible to release the glass gob at a defined height above the mold and to accelerate it by gravity such that a practically direct contact of the liquid glass to the whole mold wall takes place up to and into the region in which the stamp becomes effective by the reshaping of the kinetic energy on the impact of the glass gob onto the mold wall. Whereas a deterioration of the article quality could result at specific regions of the mold surface without this measure due to fast hardening of a thin glass layer, this undesired effect is eliminated with certainty by the glass gob supply described above via an almost perpendicular fall and guide channel which can also additionally have a shaping effect with respect to the glass gob.

It is required by the feeding of the mold and by the carrying out of the pressing process taking place in the same station for the upper part 3 of the press with the pressing stamp 5 to be designed to be able to be pivoted away or moved, which can take place, for example, via a suitable cam guide in the manner of an S curve. It is of importance in this connection that this movable pressing unit already starts during the fall of the glass stopper, accelerates in the course of the cam track and is braked again before the closing of the mold so that disturbing impact actions on the mold are avoided and ideally short cycle times can be ensured.

To preclude the glass releasing from the mold at an unwanted point during the cooling process due to shrinking and lesser quality thereby being created, a mechanical or pneumatic follow-up pressing is preferably carried out for the stabilization of the outer skin in one or more of the stations downstream of the feeding and pressing station. The corresponding pressure action takes place in the region of the head part 11, i.e. in the region of the recess 12 and, optionally, on the planar surface 14 surrounding this region.

To restrict the shrinking procedures to a region not critical with respect to the function of shrinking, the recess 12 in the head part 11 is preferably again heated directly and briefly, e.g. by means of a burner, directly after the pressing process, with this heating being restricted to this recessed region. It is achieved in this manner that shrinkage-induced collapsing effects are restricted exclusively to this non-critical region of the recess and have no effect on functional surfaces, in particular not on the planar surface 14 representing the functional surface.

If a shrinkage-induced subsiding of the surface of the recess 12 should be precluded or minimized, a pressing stamp 5 with a concave end face can be used, since the surface of the recess 12 can in this manner first be convexly shaped and then be changed into a practically planar surface by shrinkage.

All these measures contribute to both the technical demands with respect to high precision and the esthetic demands with respect to the appearance of the glass stopper being satisfied in the mass production of such glass stoppers and above all also to the tolerances in the region of the seal to be received being able to be observed very precisely.

The required cooling of the mold primarily takes place by radiation of the heat, with the mold already being able to be opened after a relatively short time and the stopper obtained, which still has a temperature of approximately 500° C. in the outer region, being able to be removed. This removal after the mold opening has taken place takes place by an ejection movement by means of the plunger 4 and by a suction grip engaging at the head part. Any jamming of the stopper in the mold is precluded in this manner.

The stopper removed in this manner can then be gripped laterally by claws and can be led via a line guide while simultaneously performing a rotary movement bringing the planar surface 14 downwardly to a transport belt which leads to a cooling track. After a corresponding cooling, the stoppers are preferably arranged in a row on a further transport track while using a so-called single-liner, where the stoppers can be checked in a fully automatic manner and can be provided with an elastic seal.

The packaging takes place subsequently, and indeed preferably in pallet form, with approximately 900 pieces being able to be accommodated in one layer per square meter so that, for example if a possible 33 layers on a pallet are used, approximately 30,000 stoppers can be combined together and a total weight of approximately 0.8 tons is obtained. This means that approximately 33 pallets or approximately 1 million stoppers can be transported without problem on a truck and, accordingly, that the transport costs per piece are largely negligible. The invention thus makes it possible to operate the respective plant for the production of glass stoppers in the location best suited for it, since the transport costs to the bottling location where the stoppers are required are of no import cost-wise.

For the practical use of the plant in accordance with the invention, it is generally of importance that the glass stoppers exit the pressing machine complete and ready for use and that no rework at all is necessary and that the glass requirements are equal to the weight of the finished parts; i.e. no disturbing residual glass at all occurs in the production. It is furthermore of importance for the economy of the plant that the glass stoppers can be transported fully automatically from the pressing mold up to and into the cooling track and can be automatically removed, checked and completed or packed at the end of the cooling track.

Figure 2:
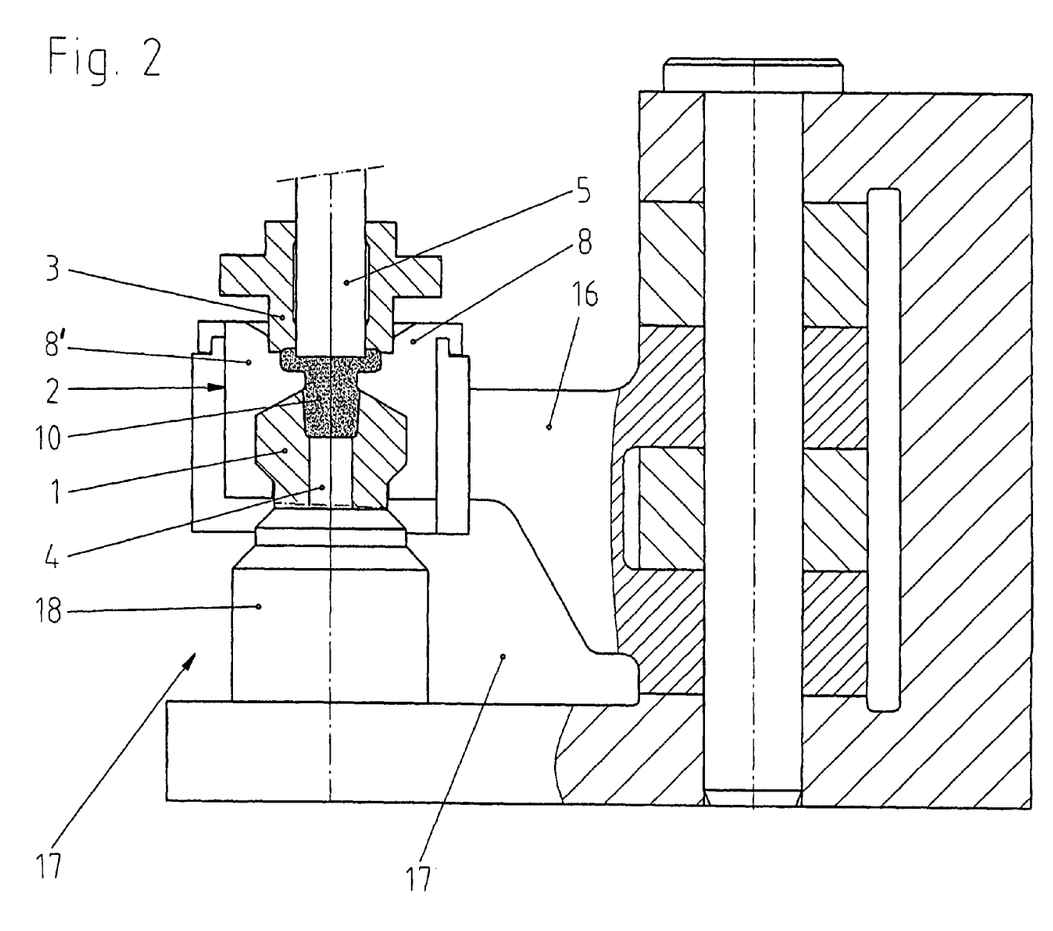
FIG. 2 is a schematic axially sectional representation of an embodiment variant in which the pressing mold is suspended freely hovering in a mold holder.

FIG. 2 shows in a schematic manner a preferred embodiment with a mold holder 16 in which the middle part 2 of the mold consisting of the base part 1, middle part 2 and upper part 3 is suspended in a practically freely hovering form. It is achieved by such a mold holder that cullets or complete stoppers which cannot be transported away cleanly fall downwardly into the free space 17 and can be removed from there. It is thus ensured that such cullets or stoppers or stopper parts can in no way disturb the closing movement of the shape as would then be the case if the molds were to slide on a base plate in a conventional manner and if the pressing forces exerted from above were transmitted directly from the mold onto the base plate and were absorbed there. In the case of the use provided in accordance with the invention of a mold holder 6, the mold is supported via a base part 18 which is individually associated with the mold and next to which the required free spaces 17 result.

Figure 3:
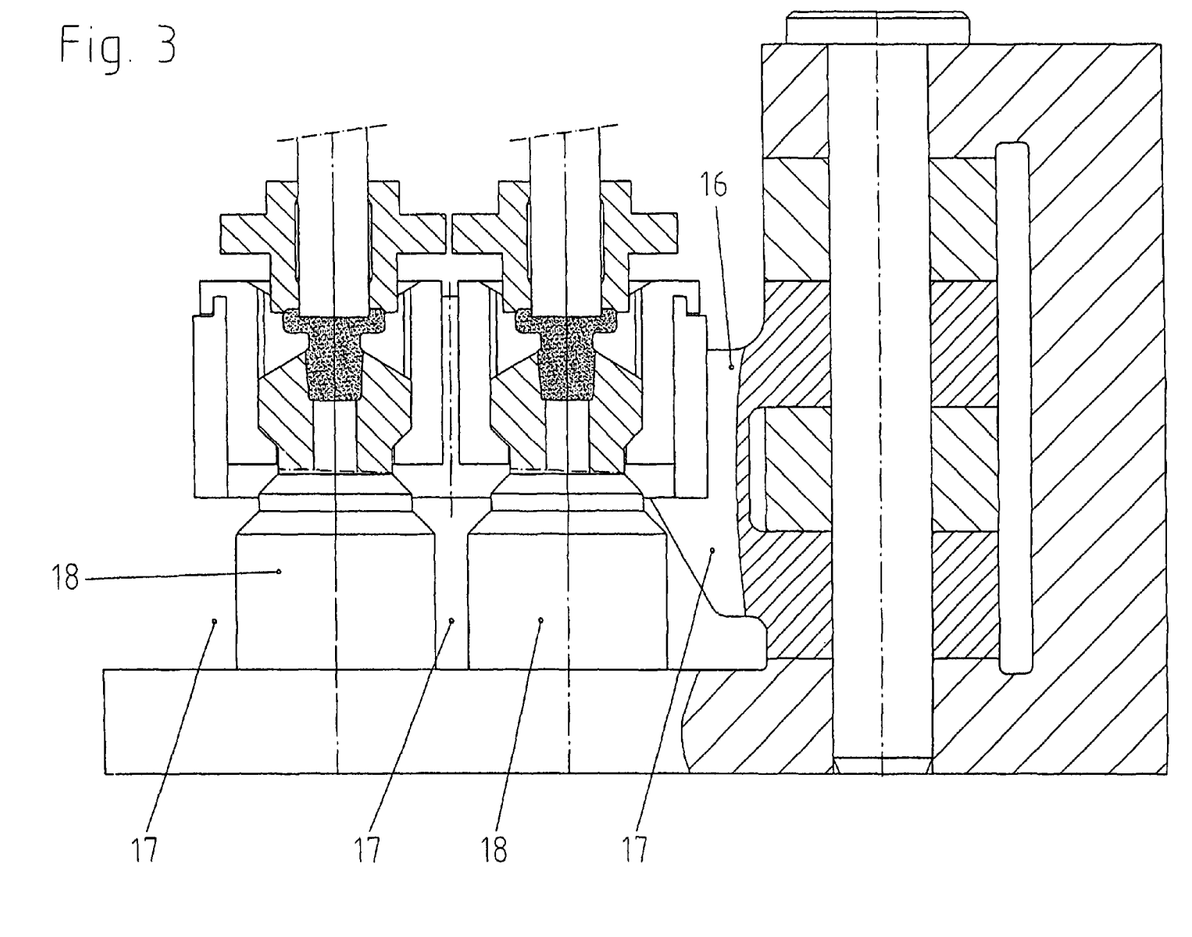
FIG. 3 is a representation substantially corresponding to FIG. 2, with two molds, however, being received simultaneously in the mold holder.

FIG. 3 substantially corresponds to the representation in accordance with FIG. 2; however, in this case, two molds are received simultaneously in the mold holder 16 to permit a double-drop operation so that two glass stoppers 10 can be pressed simultaneously. An individual support of the individual molds via a base part 18 is also achieved here while forming free spaces 17 disposed beneath the molds.

To take account of impact strains which occur on the handling of the glass stopper and in particular also on the closing of bottles and to further increase the security against possible breakage effects in the region of the flange, in accordance with the invention, the planar surface is preferably provided with a thin damping layer, preferably of a plastic material. In an analogous manner, such a damping layer could also be provided in the aluminum hood disposed opposite the planar surface of the stopper, the aluminum hood being applied engagingly over the stopper as part of the closing of bottles. Optionally, a loose damping element could also be used between the stopper and the aluminum hood.

The thickness of the damping layer to be applied to the planar surface of the stopper corresponds to a thin foil and can, for example, be applied by rolling and subsequent curing.

The invention claimed is:

1. A plant for the manufacture of glass stoppers provided with a head part for the closing of bottles, comprising a multi-part mold which determines, in the closed state, the negative contour of the stopper to be manufactured, a feeder system for supplying the mold with molten glass, a multistation press and an arrangement for the removal and for the further handling of the glass stoppers produced, the mold comprising a base part made in one part and having a cut-out corresponding to a first part length of a stopper, wherein the cut-out of the base part is bounded at a base side by a plunger having an ejection function and whose end face is smaller than the base surface of the cut-out;

a middle part of two part elements of a mold which are in particular displaceable relative to one another and perpendicular to the longitudinal axis of the mold, which can be coupled in a self-centering manner and which determine a hollow space corresponding to a second part length of a stopper and to at least a main region of the head part in the coupled state and in the state contacting the base part;

and an upper part having a central pressing stamp axially displaceable relative to the upper part, said upper part and said central pressing stamp closing the hollow space of the head part for the forming of a tolerance compensating recess in the head part of the stopper, wherein the upper part of the mold forms a planar surface surrounding said tolerance compensating recess on the head part.

2. A plant in accordance with claim 1, wherein the hollow space determined by the part elements of the mold forming the middle part extends axially beyond the planar surface of the head part and bounds the head part at its outer periphery and at a radially outwardly disposed marginal region of the planar surface.

3. A plant in accordance with claim 1, wherein the upper part with a centrally guided pressing stamp closing the hollow space of the head part has a ring nose which engages in a shape-matched manner into the hollow space determined by the part elements of the mold, with the outer diameter of the ring nose being smaller than the outer diameter of the head part.

4. A plant in accordance with claim 1, wherein the first part length of the stopper expands from the base surface of the base part and ends at a position of discontinuity of the stopper.

5. A plant in accordance with claim 4, wherein the part elements of the mold of the middle part are coupled in a self-centering manner and form the second part length of the stopper, and a reduced diameter extending from the position of discontinuity up to the head part and wherein the head part has a disk shape over practically its total height.

6. A plant in accordance with claim 5, wherein when the mold is closed, the dividing line between the upper part of the mold and the part-elements of the mold forming the middle part of the mold is disposed beneath the planar surface of the stopper in the region of a stopper rounding of the stopper.

7. A plant in accordance with claim 1, wherein the diameter of the pressing stamp is larger than the diameter of the second part length of the stopper.

8. A plant in accordance with claim 1, wherein the pressing stamp is actuated in lagging manner with respect to the upper part of the mold and a central compression spring, and wherein a plurality of compression springs are arranged in a ring shape or at least one pneumatic cylinder is fitted between the pressing stamp and the upper part.

9. A plant in accordance with claim 1, wherein the plunger has an ejection function which can be moved into a retraction position enlarging the mold depth during the feed process.

10. A plant in accordance with claim 1, wherein the mold upper part is positioned with a lateral offset, and the otherwise closed mold is fed by a feeder system designed for droplet operation with glass gobs which fall through the middle part of the mold without contact and whose diameter to length ratio is disposed in the range from approximately 1:3.5 and whose length is larger than the depth of the hollow space of the mold.

11. A plant in accordance with claim 1, wherein the station designed for the feeding of the mold with glass gobs is simultaneously made as a station for the carrying out of the pressing process.

12. A plant in accordance with claim 1, wherein a fall and guide channel is provided in the feed station for the supply of glass gobs in a centered manner with respect to the mold from a pre-settable drop height.

13. A plant in accordance with claim 1, wherein the first part length of the stopper comprises a conical surface laterally bounded by the cut-out of the base part, the conical surface beginning with a large diameter near a discontinuity where the cut-out of the base part transitions to the hollow space of the middle part, the conical surface ending with a small diameter near the base surface.

14. A plant in accordance with claim 1, wherein a one-piece first lateral surface extends upwards from the base side of the base part to the middle part, according to a first contour defined by the first part length, and wherein a two-piece second lateral surface respectively formed by the coupled two part elements extends upwards from the first lateral surface to the upper part, with the second part length defining the second lateral surface up to the planar surface surrounding said tolerance compensating recess on the head part.

15. A plant in accordance with claim 14, wherein the plunger is axially displaceable to an ejection position extending above the base side when the two part elements uncouple and split the second lateral surface.

16. A plant in accordance with claim 1, wherein the base part made in one part comprises a base part that does not need to be split in order to remove the stopper.

17. A plant for the manufacture of glass stoppers provided with a head part for the closing of bottles, comprising a multi-part mold which determines, in the closed state, the negative contour of the stopper to be manufactured, a feeder system for supplying the mold with molten glass, a multistation press and an arrangement for the removal and for the further handling of the glass stoppers produced, the mold comprising a base part made in one part and having a cut-out corresponding to a first part length of a stopper, wherein the cut-out of the base part is bounded at the base side by a plunger having an ejection function and whose end face is smaller than the base surface of the cut-out;

a middle part of two part elements of a mold which are displaceable relative to one another and perpendicular to the longitudinal axis of the mold, which can be coupled in a self-centering manner and which determine a hollow space corresponding to a second part length of a stopper and to at least a main region of the head part in the coupled state and in the state contacting the base part;

and an upper part having a central pressing stamp axially displaceable relative to the upper part, said upper part and said central pressing stamp closing the hollow space of the head part for the forming of a tolerance compensating recess in the head part of the stopper, wherein the hollow space determined by the part elements of the mold forming the middle part extends axially beyond the planar surface of the head part and bounds the head part at its outer periphery and at a radially outwardly disposed marginal region of the planar surface, wherein the upper part with a centrally guided pressing stamp closing the hollow space of the head part has a ring nose which engages in a shape-matched manner into the hollow space determined by the part elements of the mold, with the outer diameter of the ring nose being smaller than the outer diameter of the head part, wherein the upper part of the mold forms a planar surface surrounding said tolerance compensating recess on the head part.

* * * * *